(12) United States Patent
Lueckhoff

(10) Patent No.: US 7,376,902 B2
(45) Date of Patent: May 20, 2008

(54) USER INTERFACE FOR ALERTS

(75) Inventor: Hermann Lueckhoff, Sunnyvale, CA (US)

(73) Assignee: SAP AG, Walldorf (DE)

( * ) Notice: Subject to any disclaimer, the term of this patent is extended or adjusted under 35 U.S.C. 154(b) by 590 days.

(21) Appl. No.: 10/366,674

(22) Filed: Feb. 13, 2003

(65) Prior Publication Data

US 2004/0082345 A1 Apr. 29, 2004

Related U.S. Application Data

(60) Provisional application No. 60/421,365, filed on Oct. 25, 2002.

(51) Int. Cl.
*G06F 3/00* (2006.01)
(52) U.S. Cl. ............. 715/752; 715/707; 715/714; 715/751; 715/772
(58) Field of Classification Search ........... 715/751, 715/707, 714, 752, 772
See application file for complete search history.

(56) References Cited

U.S. PATENT DOCUMENTS

| | | | |
|---|---|---|---|
| 5,666,215 A | 9/1997 | Fredlund et al. | |
| 5,983,369 A * | 11/1999 | Bakoglu et al. | 714/46 |
| 6,163,772 A | 12/2000 | Kramer et al. | |
| 6,175,562 B1 | 1/2001 | Cave | |
| 6,330,243 B1 | 12/2001 | Strandberg | |
| 6,370,563 B2 | 4/2002 | Murakami et al. | |
| 6,704,874 B1 * | 3/2004 | Porras et al. | 726/22 |
| 6,999,990 B1 * | 2/2006 | Sullivan et al. | 709/205 |
| 7,149,705 B1 * | 12/2006 | Haruki et al. | 705/14 |
| 2001/0048449 A1 * | 12/2001 | Baker | 345/758 |
| 2001/0054064 A1 * | 12/2001 | Kannan | 709/203 |
| 2002/0064149 A1 | 5/2002 | Elliott et al. | |
| 2002/0130904 A1 * | 9/2002 | Becker et al. | 345/753 |
| 2003/0035532 A1 | 2/2003 | Ganesan et al. | |
| 2003/0043180 A1 * | 3/2003 | Gusler et al. | 345/708 |
| 2003/0058277 A1 | 3/2003 | Bowman-Amuah | |

(Continued)

FOREIGN PATENT DOCUMENTS

EP 926614 6/1999

(Continued)

OTHER PUBLICATIONS

U.S. Appl. No. 10/366,644, filed Feb. 13, 2003, Lueckhoff.
SAP Aktiengesellschaft, "Broadcast Messaging," CRM 4.0, SP01, Jul. 2003, 3 pgs.

*Primary Examiner*—David Wiley
*Assistant Examiner*—Ryan F Pitaro
(74) *Attorney, Agent, or Firm*—Fish & Richardson P.C.

(57) ABSTRACT

Various implementations of the present invention provide systems and methods for interactive scripting in a distributed computing system. One implementation provides a method for displaying alert information on a display device. In this implementation, the method includes displaying work information in a work area of the display device, wherein the work information relates to an interactive session between a user and a specified person. The method further includes displaying alert information in a reserved area of the display device, wherein the alert information relates to a business-relevant situation for the interactive session between the user and the specified person. The reserved area of the display device is located in proximity to the work area of the display device and is persistently viewable by the user while the user is working in the work area.

20 Claims, 9 Drawing Sheets

U.S. PATENT DOCUMENTS

| | | |
|---|---|---|
| 2003/0187672 A1* | 10/2003 | Gibson et al. .................. 705/1 |
| 2003/0187876 A1 | 10/2003 | Ohnishi |
| 2003/0195811 A1 | 10/2003 | Hayes et al. |
| 2003/0231241 A1 | 12/2003 | Iida |
| 2004/0054647 A1 | 3/2004 | Inabs et al. |
| 2004/0082345 A1 | 4/2004 | Lueckhoff |
| 2004/0174980 A1 | 9/2004 | Knott et al. |
| 2004/0260759 A1 | 12/2004 | Smoliar et al. |
| 2005/0075115 A1 | 4/2005 | Corneille et al. |
| 2005/0132298 A1 | 6/2005 | Lueckhoff et al. |

FOREIGN PATENT DOCUMENTS

| | | |
|---|---|---|
| WO | WO 98/21664 | 5/1998 |
| WO | 00/72562 | 11/2000 |

* cited by examiner

USER INTERFACE FOR ALERTS

RELATED APPLICATION

The present application claims the benefit of the filing date of U.S. Provisional Application No. 60/421,365, which was filed on Oct. 25, 2002. The contents of U.S. Provisional Application No. 60/421,365 are hereby incorporated by reference into the present application in their entirety.

TECHNICAL FIELD

This invention relates to computing systems, and more particularly to a user interface for an alerts in such computing systems.

BACKGROUND

In recent years, telephone call centers have become much more widespread. The call centers manage many efforts, and call center agents working in these centers often place thousands of calls to various consumers in different regions of the country. These agents often use headsets to speak with consumers while the agents concurrently enter information relating to the consumers into a computer workstation.

Under the traditional approach, companies interacted with potential consumers in person. Telephone call centers have become more widespread as a result of a desire by many of such companies to interact with consumers via telephone instead. Using this form of communication, call center agents are able to conduct many transactions over a short period of time.

There are a wide variety of transactions carried out by these telephone call centers. For example, banks may want to contact current customers and ask these customers if they would be interested in obtaining a new credit card. Long distance telephone companies may want to contact homeowners and ask if they would be interested in switching long distance carriers. Fund raisers may call individuals to ask for donations. And various other telemarketers may call homeowners or business owners for solicitation of various products or services.

Because there are so many different types of consumers and transaction types, there are many events and scenarios that may occur during a given session with a customer. Often, these events will occur as a result of input obtained from the customer, situations arising in the system related to the session with the customer, a combination of these, and the like. For example, a session may last longer than the fifteen minute baseline established at the outset with the customer (e.g., during a telephone survey). Or, the customer may have selected a purchase for an item having a set of other accessories that could be made known to the customer by the agent. Or, the customer may be designated as a VIP or platinum customer. All kinds of events could occur during the customer session that may affect the subsequent course of dealing between the customer and the agent.

In many cases, systems used by call center agents in telephone call centers provide some sort of notification that is intended to make the agent aware of a situation (which may need to be directly communicated to the customer, or which may cause the agent to take appropriate action in response to the notification). Though these notifications are intended to be used by the agents, they may often be missed or overlooked, because the agents are not aware of their existence. For example, the notifications may be sent to the agent's computer (or workstation) into a location (such as a database) that needs to be periodically, or manually, checked by the agent. Because the agent uses the computer for various purposes during a transaction with a customer, the agent may forget (or not have time) to manually check for notifications. Even if notifications are to be displayed to an agent somewhere on their computer display, the notifications are usually displayed on different screens from the session screen, or placed in obscure locations, making them difficult for the agent to see. Even if the agent is able to notice the notification, it is not always easy to obtain further detailed information about the nature (or cause) of the notification.

In addition, when such notifications of more traditional systems are built into the system, they often contain contents (and event triggers to initiate the notifications) that are predetermined. These notifications will not contain specific information about a particular customer, or be capable of being easily modified to be tailored for a specific session with a customer.

SUMMARY

Various implementations of the present invention provide systems and methods for interactive scripting in a distributed computing system. One implementation provides a method for displaying alert information on a display device. In this implementation, the method includes displaying work information in a work area of the display device, wherein the work information relates to an interactive session between a user and a specified person. The method further includes displaying alert information in a reserved area of the display device, wherein the alert information relates to a business-relevant situation for the interactive session between the user and the specified person. The reserved area of the display device is located in proximity to the work area of the display device and is persistently viewable by the user while the user is working in the work area.

Advantages of certain implementations of the invention may be one or more of the following. In various scenarios, a user is capable of being notified of situations at opportune moments in time. For example, in a call center environment, a call center agent may engage in a transaction with a customer. After the customer has requested information about a particular product, the agent may receive a notification (that is prominently displayed on the screen) regarding other related product offerings, or a notification containing information based on prior transactions with the customer. In addition, in various implementations, notification profiles can be configured and changed dynamically, so that no coding is required.

The details of one or more implementations of the invention are set forth in the accompanying drawings and the description below. Other features, objects, and advantages of the invention will be apparent from the description and drawings, and from the claims.

DETAILED DESCRIPTION

Figure 1:
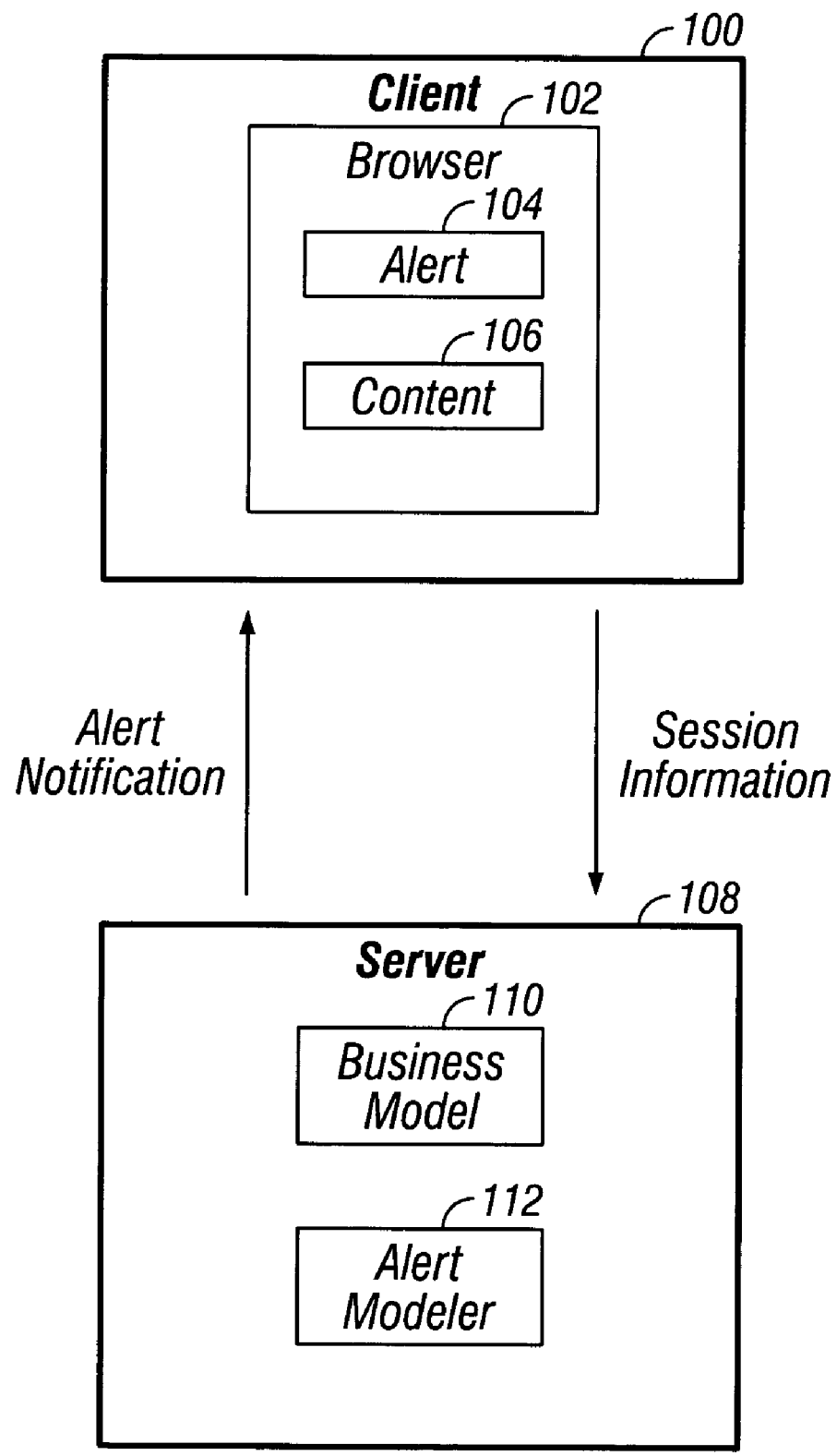
FIG. 1 illustrates a high-level block diagram of an implementation for alert modeling using a client-server architecture.

FIG. 1 illustrates a high-level block diagram of an implementation for alert modeling using a client-server architecture. In this implementation, an alert is displayed to a user (such as a call center agent) while the agent communicates with a specified person (such as a customer) during an interactive session. Session information relating to the interactive session with the specified person is obtained and sent by client 100 to server 108. Server 108 processes the information and generates an alert notification that is related to a business-relevant situation for the specific session being conducted. The alert notification is sent from server 108 to client 100 for display in reserved area 104 of browser 102. Reserved area 104 is a specific area within browser 102 that is always visible to the user. In this fashion, the user will be able to view alerts that pertain to the session and respond appropriately to the customer. Since alerts can happen at any given time, it is important to ensure that they are always visible to the user.

The main purpose of alerts is to bring the occurrence of a specific business-relevant situation to the call center agent's awareness. Business-relevant in this context means that this information might have an impact on how the agent would handle the customer interaction. Examples include certain key figures extracted from business warehouse module (e.g., sales during the last 6 months) or the fact that a service contract will run out within the next 2 weeks. Another example could be a cross-selling opportunity or a simple classification of the customer (like platinum, gold, silver customer). Any kind of information can be considered that should provoke a reaction of the call center agent.

In one implementation, the user is a call center agent operating within the framework of customer relationship management (CRM). The call center agent begins a session with a customer. The agent may speak with the customer over the phone, or alternatively may communicate with the customer using an on-line chat session. The agent uses browser 102 while participating in the session. During the session, various forms of session information is sent from client 100 to server 108. Server 108 processes the session information using business model 110 and alert modeler 112, and determines if an alert notification (relating to the customer session) needs to be sent back to client 100. If such an alert notification is sent, client 100 processes the notification, and prominently displays the contents of the notification (i.e., alert) in reserved area 104 in browser 102. In one implementation, the alert displayed in reserved area 104 is a navigable alert. If the call center agent selects (or clicks) on the navigable alert, another window within browser 102 (or an additional browser, in one implementation) is shown to the agent to display further information relating to the customer session, or to display detailed information relating to the alert notification.

Browser 102 is used by the user to display various forms of information relating to the customer session. Browser 102 may be any form of web-enabled browser, such as Internet Explorer, Netscape, Opera, Mozilla, and the like. Browser 102 includes reserved (alert) area 104, and business content area 106. Content area 106 displays the business content for the session between the call center agent and the customer. For example, content area 106 may include script information that the agent reads to the customer over the phone, or it may include order or product information (in some implementations). Reserved area 104 is designated specifically for displaying alerts that are sent from server 108 and that are to be displayed to the user.

Server 108 contains business model 110 and alert modeler 112. Business model 110 includes the entire model used for business operations within the client-server system. In one implementation, business model 110 is an object-oriented model, from which business 30 objects are instantiated at run time. Business model 110 is capable of providing the business data context for customer sessions between a call center agent and customers. Session information sent to server 108 from client 100 is used to define the business context (for that session). Alert modeler 112 interacts with business model 110 to process the business data context for the session. Alert modeler 112 contains profile and configuration information relating to one or more alert notifications that are used in the system. Alert modeler 112 processes the information provided by business model 110, along with its alert profile and configuration information, to determine if an alert notification will be sent from server 108 to client 100.

Figure 2:
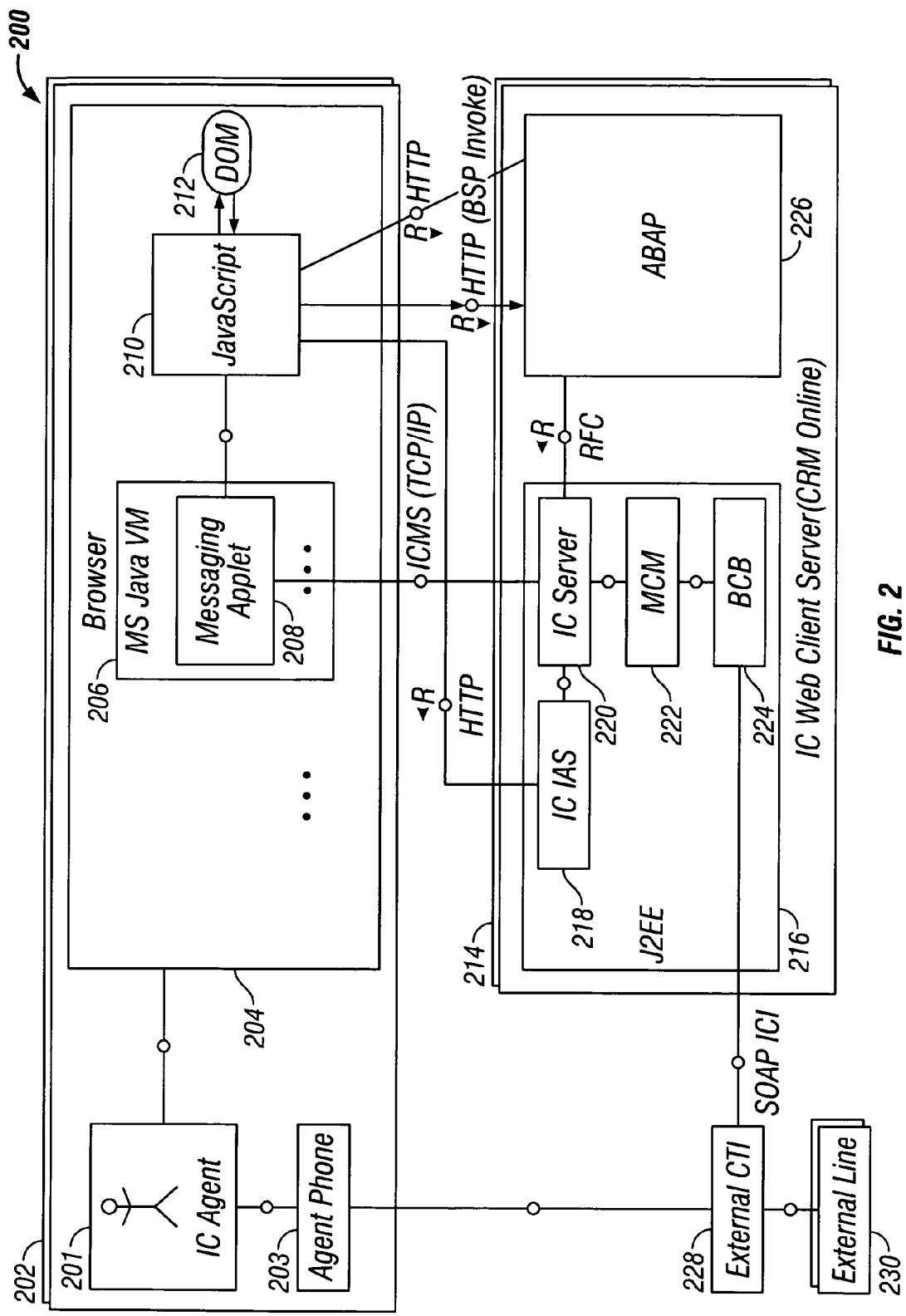
FIG. 2 illustrates a block diagram of a system that is capable of providing alert modeling functionality, according to one implementation.

FIG. 2 illustrates a block diagram of a system that is capable of providing alert modeling functionality, according to one implementation. In this implementation, system 200 is part of an Interaction Center (IC) in an e-business environment. In one implementation, the components shown in system 200 are interconnected to provide alert notifications to call center agent 201. Call center agent 201 (in one implementation) uses browser 204 while interacting with a customer in a session (such as in a telephone conversation). Information about this session is entered into the system by the agent using browser 204. As a result, a request is sent to server system 214. Server system 214 processes the information and generates an alert notification for the session with the customer. The alert notification contains information particular to the customer (in one implementation). The alert is sent back to browser 204 (in client 202) for display to call center agent 201. The alert is prominently displayed in browser 204 in a region that is persistently visible to agent 201, to maximize the chances that the alert will be seen by agent 201 and communicated to the customer.

FIG. 2 shows a block diagram containing various components. For example, there are actors, such as agent 201. There are certain components that serve as data stores, and there are various flows of data between the components, such as Hypertext Transfer Protocol (HTTP) requests and responses. System 200 includes client entity 202 and server system 214. Client entity 202 provides various client-side functionalities. In this implementation, in which system 200 functions as an Interaction Center (IC), a call-center agent may use client entity 202 while interacting with a customer (e.g., via phone, email, chat, etc.). Client entity 202 is operatively coupled to two different servers in server system 214: server entity 226 (ABAP), and server entity 216

(J2EE). Server entities 226 and 216 provide different server-side functionalities (in this implementation), and provide server system 214 with a distributed-functionality architecture. ABAP server 226 is coupled with J2EE server 216 via a remote function call (RFC) interface. Using RFC, these servers may share session data for a given user context on client entity 202. External computer telephony integration (CTI) 228 is coupled to agent phone 203 of client entity 202, and provides an external phone functional interface. External line 230 is coupled to external CTI 228. External CTI 228 also propagates event information via a Simple Object Access Protocol (SOAP) interface into server system 214 (and directly to business communication broker (BCB) 224). During operation, call-center agent 201 uses browser 204 on client entity 202 to interact with a customer. As a result of the interaction, client entity 202 propagates events particular to the transaction (or user context of agent 201) to server system 214. ABAP server 226 and J2EE server 216 create independent sessions (containing state information specific to the transaction initiated on client entity 202). These independent sessions are then coupled to form a common virtual session for the user context, and data synchronization is achieved in server system 214.

Client entity 202 includes browser 204. Browser 204 is utilized by a user, which is shown as IC call agent 201 in FIG. 2. In an e-business environment, a call agent may use browser 204 on client entity 202, as well as other tools (such as agent phone 203), when interacting with a customer. Such interactions are part of customer relationship management (CRM), in some implementations. CRM is an information industry term for the methodologies, software, and often Internet capabilities that help an enterprise manage customer relationships in an organized way. In FIG. 2, browser 204 includes Java virtual machine (VM) 206, which includes run-time messaging applet 208 for messaging operations. JavaScript module 210 is used to implement an external interface to server system 214, and the code interacts with document object model (DOM) 212, in one implementation. DOM 212 is a platform- and language-neutral interface that allows programs and scripts to dynamically access and update the content, structure, and style of documents.

Client entity 202 is coupled to server system 214 using two interfaces. The first interface is a web-enabled HTTP request/response interface. The second interface is a Transmission Control Protocol/Internet Protocol (TCP/IP) interface. In one implementation, the TCP/IP interface provides a dedicated, persistent, and bi-directional connection between client entity 202 and server system 214. JavaScript module 210 used by browser 204 manages HTTP requests that are sent to server system 214. HTTP requests are sent both to ABAP server 226 and to J2EE server 216 (specifically to IC interactive scripting (IAS) module 218, in one implementation). In one implementation, HTTP requests are sent only from client entity 202 to ABAP server 226. The TCP/IP interface couples client entity 202 directly to J2EE server 216. A messaging service (in IC Server 220) operates on J2EE server 216 to form the server side of the TCP/IP interface, and messaging applet 208 running on browser 204 forms the client side of the interface. Messaging applet 208 running on browser 204 exposes an interface to the client code (JavaScript 210) for subscription, notification of incoming messages, and sending of outgoing messages. The persistent TCP/IP connection (which uses the Interaction Center Messaging Service, or ICMS) allows client 202 and J2EE server 216 to communicate on an as-needed basis.

Server system 214 includes ABAP (SAP enterprise) server 226, and Java 2 Platform, Enterprise Edition (J2EE) server 216. ABAP is a programming language for developing applications on an SAP system (which is a widely installed business application system). ABAP is an object-oriented programming language. J2EE is a Java platform designed for large enterprise systems. J2EE simplifies application development, and uses standardized, reusable modular components. In other implementations, other structured or object-oriented programming languages may be used on server 226. IC Server module 220 is the container for all Java components, and provides a basic session management. ABAP server 226 and J2EE server 216 illustrate the distributed server architecture of server system 214.

ABAP server 226 is able to communicate with J2EE server 216 using a remote function call (RFC) interface. In other implementations, different methods of communication between ABAP server 226 and J2EE server 216 are used. In one implementation, HTTP may be used.

J2EE server 216 includes BCB component 224 that is coupled with external CTI 228 using a SOAP interface. BCB 224 is coupled with multi-channel manager (MCM) 222 for handling events across the multi-channel interface. Various external conditions in system 200 may trigger events that need to be processed. For example, certain multi-channel events (e.g., phone, chat, etc.) may occur as a result of call agent interaction with a customer. These events can be propagated, in one implementation, to J2EE server 216 using a multi-channel connection. In one implementation, SOAP is used for the multi-channel interface into J2EE server 216. External CTI 228 generates multi-channel events that are propagated from BCB 224 to MCM 222, and then further processed by IC Server 220.

In one implementation, client entity 202 and server system 214 provide alert modeling functionality. Customer transaction information is sent from client entity 202 to server system 214 (in one implementation), and server system 214 processes the information to check for various conditions. If such conditions exist, server system 214 notifies client entity 202. Upon notification, one or more alerts are prominently displayed to agent 201 using browser 204. In one implementation, the alerts are navigable alerts. Agent 201 may select these navigable alerts to view different screens pertaining to the alerts.

Figure 3:
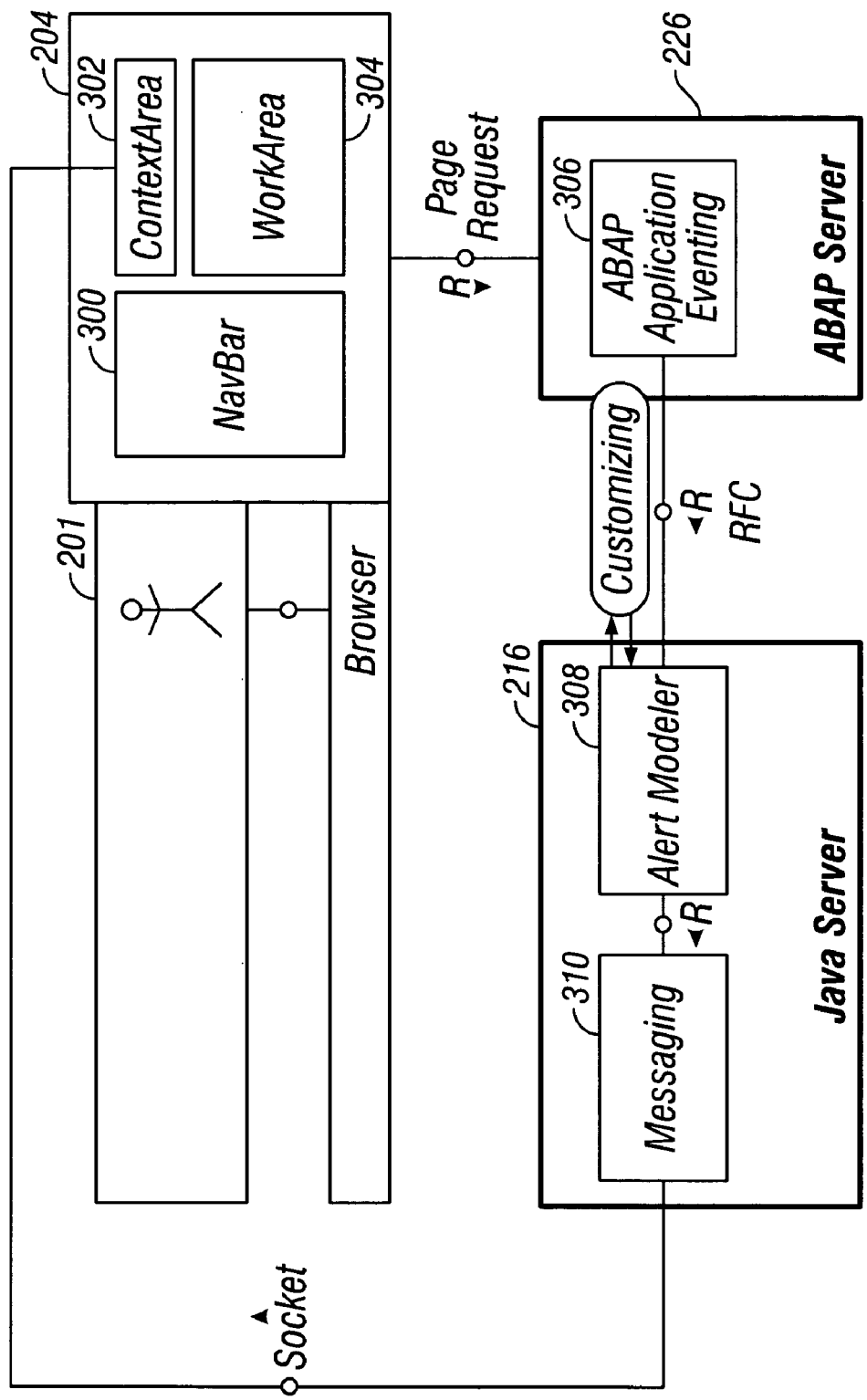
FIG. 3 illustrates a block diagram showing a detailed implementation of various components shown in FIG. 2.

FIG. 3 illustrates a block diagram showing a detailed implementation of various components shown in FIG. 2. In this implementation, call center agent 201 uses browser 204 while interacting with a customer. During an interactive session with the customer, agent 201 may be presented with alert information pertaining to the session in reserved (context) area 302, which is always visible to agent 201 during all phases of the session. In one implementation, the alert information contains information that is particular to the customer in the session. The alert information is sent to browser 204 from Java (J2EE) server 216 as a result of previous session information sent from browser 204 to ABAP server 226, as described in more detail below.

Call center agent 201 uses browser 204 while interacting with a customer. In one implementation, call center agent 201 converses with the customer directly using the telephone. Call center agent uses browser 204 as an aid during the session. Browser 204 contains navigational bar 300, context area 302, and work area 304. These areas 300, 302, and 304 are each displayed to call center agent 201 using browser 204. Navigation bar 300 is a vertically oriented bar that provides navigational functionality. Navigation bar 300 is a navigational HTML frame, in one implementation. Navigation bar 300 may include one or more selectable buttons. In one implementation, the selectable buttons are clickable links. Upon selection, various views will be displayed to agent 201 in work area 304. Work area 304 contains text and other session-related items for display to agent 201 while interacting with the customer. For example, work area 304 may include script information that can be read to the customer over the telephone. Finally, context area 302 is a reserved screen area within browser 204. Context area 302 is capable of prominently displaying alert notifications that are to be called to the attention of (and readily noticeable to) agent 201. Context area 302 is always visible to agent 201, regardless of the state of the session or of the information shown in work area 304.

Session information relating to the interaction between a customer and call center agent 201 (in one implementation) is sent from browser 204 to ABAP server 226. In one implementation, this occurs as the result of a page request from browser 204 to ABAP server 226 (e.g., using a HTML GET or POST request). ABAP server 226 uses ABAP application eventing component 306 to process the request (which includes session information). ABAP application eventing component 306 is part of the business logic for the system (within the business data context), and determines if an application event needs to be raised. Such an event will be a trigger that may eventually invoke an alert server in Java server 216 for a specific event. Various application events can be raised. For example, an event indicating that the customer is a platinum customer could be raised. Or, an event indicating that a session timeout occurred could be raised. Any of an assortment of events can be programmed into the system using ABAP application eventing component 306.

The event is then propagated to Java server 216 using a remote function call (RFC). In one implementation, the event is sent to Java server 216 using an HTTP request instead. On Java server 216, the event is processed by alert modeler 308. Alert modeler 308 determines (based on its customizing) whether any alert is associated with this application event. Alert modeler 308 contains alert information within customizable configuration information. Such information may be modified and/or rearranged by using different input parameters. In this fashion, a user may change the behavior (or contents) of alerts dynamically, without having to write any source code. In one implementation, alert modeler contains Extensible Markup Language (XML) configuration information, as will be further described in FIG. 4.

If an alert is associated with the event, an alert class (in one implementation) specified in the alert customizing is invoked, and any event parameters are passed on. The logic in the alert class is executed to determine whether the alert should be displayed, and to evaluate all properties and placeholders declared in the customizing (in alert modeler 308). For example, XML configuration information for an alert may contain various placeholders that must be filled in with contextual parameters. This may include text that is to be displayed in the alert. At run time, the placeholders are populated with various information, some of which may be passed from ABAP server 226.

The resulting alert message is sent to messaging service 310. Messaging service sends it (via a persistent socket connection, in one implementation) to browser 204. At browser 204, there is an applet that represents the client side of the messaging service. When the alert message is received, a Javascript event handler is invoked on browser 204 that parses the message context and renders the message within context area 302 of a web page. In one implementation, the message is shown in context area 302 using dynamic HTML (DHTML).

Since messaging service 310 maintains its own socket connection to browser 204 (in one implementation), the alerts can be displayed asynchronously to the application logic using context area 302 (and is therefore not limited by the HTTP request-response cycle between browser 204 and an HTTP server). This also ensures real-time rendering of the alert information in context area 302, regardless of the state of the rest of the system.

In one implementation, the alert shown in context area 302 is a navigable alert. A navigable alert is one that not only raises awareness for a specific situation to agent 201, but also navigates to a part of the application that is related to the context of the alert once it is selected (or clicked, in one implementation). For example, agent 201 may be shown (automatically) detailed information about the alert in a separate window. Alternatively, agent 201 may select (or click on) the navigable alert in context area 302 to see additional information about the alert, which may be shown in a separate window. For example, agent 201 may be navigated to a wrap-up screen after agent 201 has been alerted (in context area 302) that it is time to end the conversation with the customer. The destination of the navigation is also subject to customizing. A user may customize the configuration information using alert modeler 308 to modify the navigation information for a navigable alert.

Figure 4A:
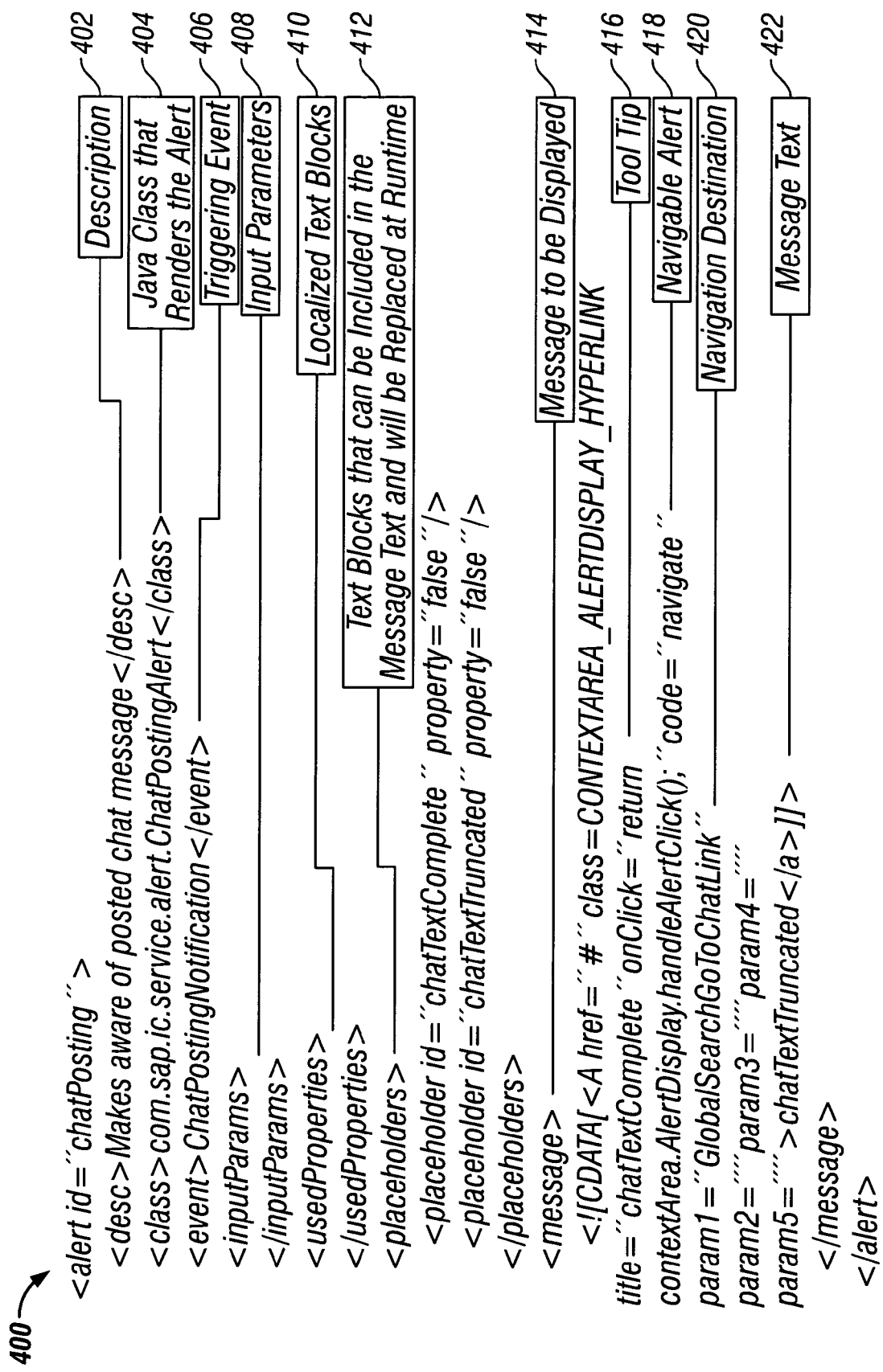
FIG. 4A illustrates a first example of customizable XML alert configuration information that is capable of being processed by the alert modeler shown in FIG. 3.

FIG. 4A illustrates a first example of customizable XML alert configuration information that is capable of being processed by the alert modeler shown in FIG. 3. Alert definition 400 contains various fields for providing alert information to a user (such as an alert configuration manager or designer). In the implementation shown in FIG. 4A, alert definition 400 is written using XML notation. Alert definition 400 does not need to be compiled, and therefore can be dynamically modified by a user at any point in time (including at run time). In one implementation, the modifications take effect the next time the user starts the application. Various configuration parameters can be modified to customize the alert information that will ultimately be displayed to a call center agent. Alert modeler 308 (shown in FIG. 3) is capable of processing alert definition 400 to create an alert that is sent from Java server 216 to browser 204 for display in context area 302.

Alert definition 400 contains fields for various different functions within the definition. Each field includes a tag and field information. Tags are delimited by the < >characters. These XML tags are similar in format to HTML tags. As shown in FIG. 4A, alert definition 400 contains "<alert>" and "</alert>" tags to represent the beginning and end of the alert definition. Field information for the fields can contain text, variables, parameters, and the like. Various fields within alert definition 400 are customizable, meaning that the alert ultimately displayed to a call center agent can be specifically tailored (or designed) by adjusting the contents of alert definition 400.

The first field shown in alert definition 400 is description field 402. Description field 402 contains the "<desc>" tag, and also field information describing the nature of the alert. In the example shown in FIG. 4A, the alert description in field 402 describes the alert as one making a call center agent aware of a posted chat message (e.g., from a customer).

The next field shown is class field 404. Class field 404 contains the "<class>" tag, and also field information to define the Java class that implements this alert. The implementation class encapsulates all logic required to determine if and how an alert is rendered to a user, such as a call center agent. These classes included in class field 404 can be fairly simple (e.g., just replacing certain place holders) or more complex (e.g., evaluate sophisticated rules to determine whether an alert is to be displayed). However, all alert classes that can be included within class field 404 implement a common interface. An alert designer (which may even include a customer, in some instances) can choose from a set of out-of the-box classes to customize his own alerts.

Event field 404 contains the "<event>" tag, and field information for defining the triggering event for an alert. If this event is raised by the application logic (stemming from ABAP server 226), the execution of the implementing alert class is invoked. In this fashion, the events coming from ABAP server 226 trigger the alerts generated by Java server 216 and sent to browser 204.

Input parameters field 408 contains the "<inputParams>" tag, and field information for declaring parameters that can be passed to the alert execution at browser 204. For example, a reminder alert shown in reserved (context) area 302 of browser 204 could indicate to the call center agent that a certain amount of time has elapsed and that it is time to wrap up the call with the customer. In this case, the number of seconds after which the alert reminder should appear would be an input parameter sent to browser 204 via messaging server 310.

Localization field 410 contains the "<usedProperties>" tag, and also field information for declaring localized text blocks. These localized text blocks are provided by the alert class (indicated in field 404) and can be merged into the text message defined in message field 414 (described further below).

Figure 5:
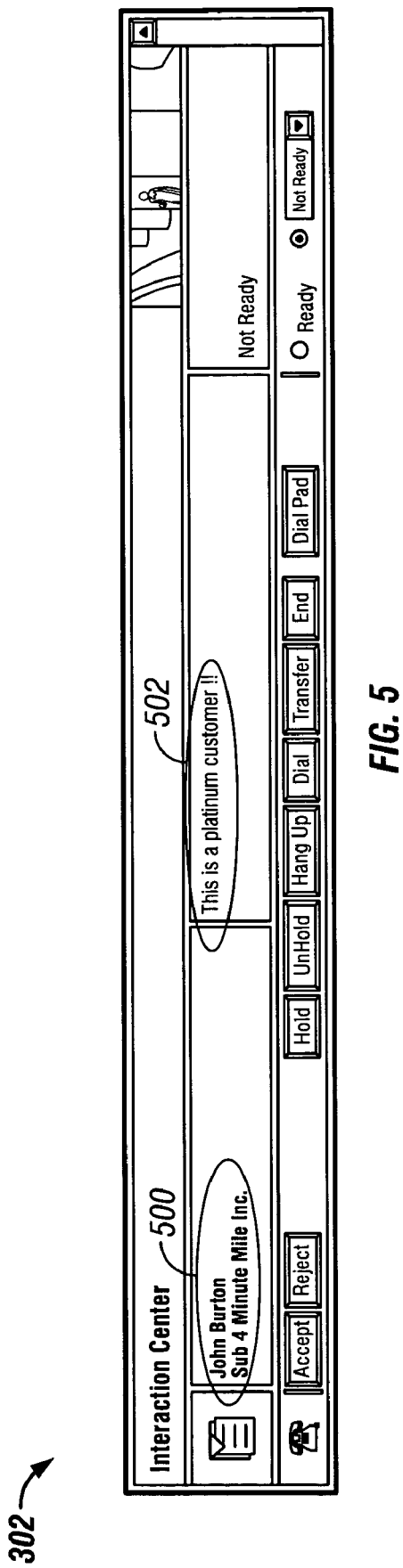
FIG. 5 illustrates a partial screen display of an alert prominently displayed in the reserved area shown in FIG. 3.

Placeholder field 412 contains one or more "<placeholder>" tags, as well as field information (for each tag) for declaring placeholders, which the alert class (defined in field 404) will substitute with actual values at run time. They can be also merged into the text message defined in message field 414. Each placeholder has a unique identifier that can be used by the alert class for substitution. For example, the identifiers shown in placeholder field 412 for the placeholders are "chatTextComplete" and "chatTextTruncated." Message field 414 contains the "<message>" tag, and field information for defining the format and content of the message to be displayed in browser 204. In one implementation, the message is specified as HTML code that will be sent via messaging service 310 to browser 204, and will be rendered at browser 204 (in context area 302) by a JavaScript code snippet using DHTML. Other formats (e.g., a specialized XML format) could be used, as well. Message field 414 contains various subfields. Tool tip subfield 416 provides a title name serving as a tip (i.e., indicator) of the type of alert to be displayed. For example, the tip shown in subfield 416 indicates that the chat text is complete. Subfield 418 indicates the alert definition 400 specifies a navigable alert. A navigable alert, in one implementation, is a selectable alert (by the call center agent, for example) to provide more detailed contextual information about the alert. In one implementation, the navigable alert, when selected (or clicked, in one implementation), displays information in a navigation selection. This selection is customizable using subfield 420 (navigation destination). The subfield is set by completing one of the parameters ("param1," as shown in FIG. 5). The value indicates the destination for the alert, if the call center agent selects the alert upon display within browser 204. This may be a separate window within browser 204, or a separate portion of an existing window in browser 204. Message text for the alert can also be specified in subfield 422.

In other implementations, other fields are added to alert definition 400 to provide added functionality. In addition, extra fields (or modified fields, in some implementations) provide the flexibility to further customize the contents and behavior of an alert defined by alert definition 400. Certain fields can be modified or selected during the customization process.

Figure 4B:
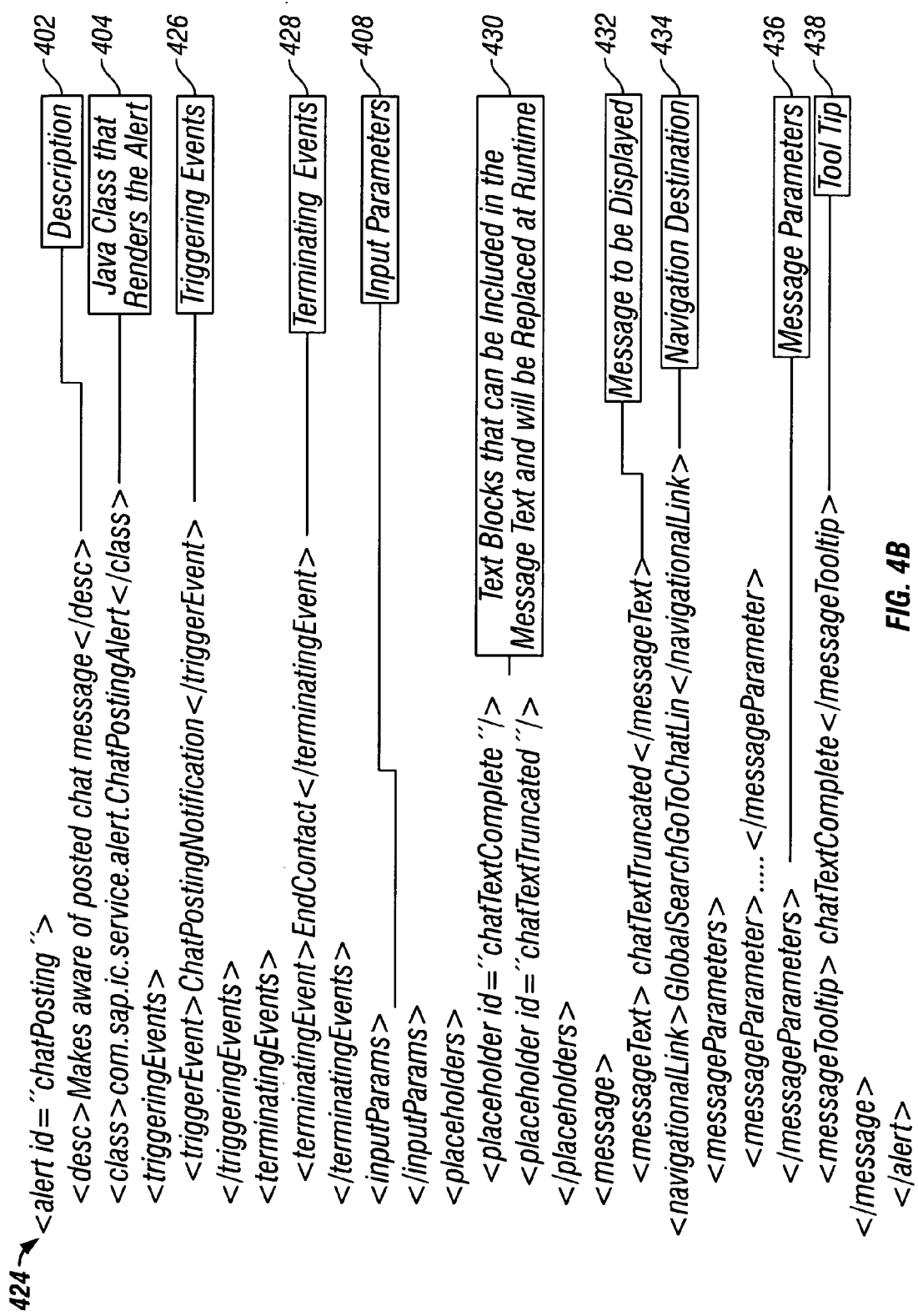
FIG. 4B illustrates a second example of customizable XML alert configuration information that is capable of being processed by the alert modeler shown in FIG. 3.

FIG. 4B illustrates a second example of customizable XML alert configuration information that is capable of being processed by the alert modeler shown in FIG. 3. Alert definition 424 contains various fields for providing alert information to a user (such as an alert configuration manager or designer). In the implementation shown in FIG. 4B, alert definition 424 is written using XML notation. Alert definition 424 does not need to be compiled, and therefore can be dynamically modified by a user at any point in time (including at run time). In one implementation, the modifications take effect the next time the user starts the application. Various configuration parameters can be modified to customize the alert information that will ultimately be displayed to a call center agent. Alert modeler 308 (shown in FIG. 3) is capable of processing alert definition 424 to create an alert that is sent from Java server 216 to browser 204 for display in context area 302.

Alert definition 424 contains fields for various different functions within the definition. Each field includes a tag and field information. Tags are delimited by the < > characters. Various fields within alert definition 424 are customizable, meaning that the alert ultimately displayed to a call center agent can be specifically tailored by adjusting the contents of alert definition 424.

Alert definition 424 contains some of the same fields as alert definition 400 shown in FIG. 4A. For example, alert definition 424 includes description field 402, Java class field 404, and input parameters field 408. Alert definition 424 also contains new fields that were not included in alert definition 400. Triggering events field 426 contains the <triggeringEvents> tag, and field information for defining one or more triggering events for an alert. Each of the individual triggering events are defined by the field information associated with each <triggerEvent> tag. In this fashion, an alert designer (in one implementation) is able to define a set of triggering events, any of which will invoke the implementation of the alert.

Terminating events field 428 contains the <terminatingEvents> tag, and field information for defining one or more terminating events for an alert. Each of the individual terminating events are defined by the field information associated with each <terminatingEvent> tag. If any of these events are raised by the application logic (stemming from ABAP server 226, in one implementation), then an alert that has been previously displayed will be removed from context area 302. Such an event could be raised (in one implementation) after the user has clicked a navigable alert (and therefore implicitly acknowledged it). After clicking, it may not be desirable to further display the alert. When the event is raised and processed by Java server 216, Java server 216 then sends a message to browser 204 (according to one implementation), indicating that browser 204 may discontinue display of the alert.

Placeholders field 430 contains the <placeholders> tag, and field information for defining one or more placeholders, each of which contain the <placeholder> tag. The field information associated with each <placeholder> tag includes an identifier for one or more text blocks that can be included in the message text of an alert, and which will be replaced at run-time with the appropriate contents.

Message text field 432 contains the <messageText> tag, and field information for the message to be displayed by the alert. Message text field 432 is contained within the message field (which serves as a container field). Navigation field 434 contains the <navigationalLink> tag, and field information for the navigational link (for a navigable alert). In one implementation, when a user selects (or clicks) a navigable alert at run time, the navigation destination will be determined by the field information for navigation field 434.

Message parameters field 436 contains the <messageParameters> tag, and field information for message parameters that can be used for a given message. Each parameter is defined within the field information associated with each <messageParameters> tag. In one implementation, message parameter information is sent along with the alert to browser 204. Browser 204 is then able to use these parameters in determining when/how/etc. to display the alert.

Tool tip field 438 contains the <messageTooltip> tag, and field information for tip information that can be provided to a use. When the alert is sent to browser 204 and displayed (in one implementation), the user may move his/her selection pointer over the alert (without actually selecting the alert) to obtain pop-up (tool tip) information about the nature/content/etc. of the alert. In one implementation, the tool tip contains information about a navigable alert.

Message text field 432, navigation field 434, message parameters field 436, and tool tip field 438 are each contained within the message field shown in FIG. 4B. The message field serves as a container element for each of these message-related fields.

Figure 4C:
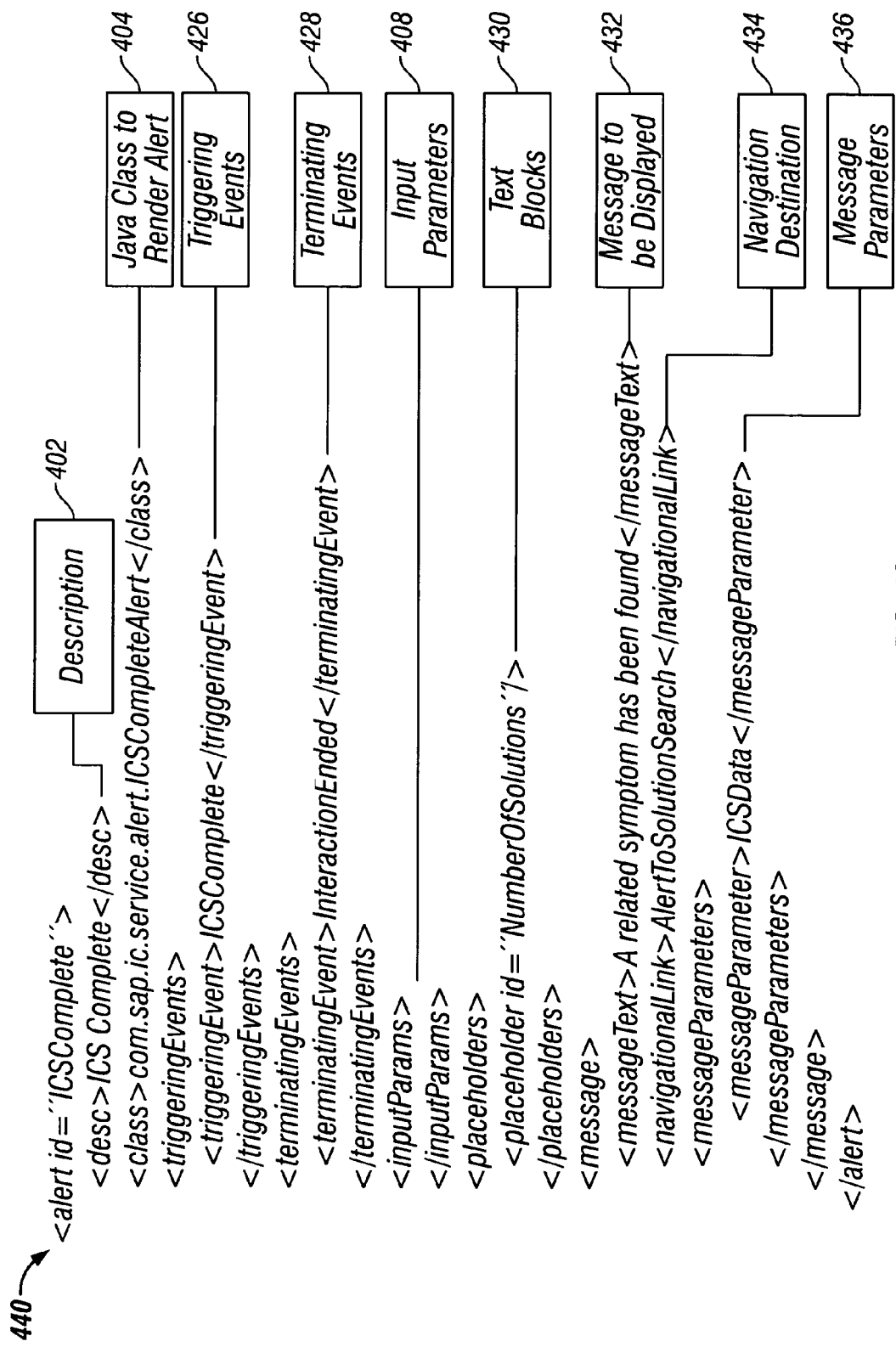
FIG. 4C illustrates a third example of customizable XML alert configuration information that is capable of being processed by the alert modeler shown in FIG. 3.

FIG. 4C illustrates a third example of customizable XML alert configuration information that is capable of being processed by the alert modeler shown in FIG. 3. FIG. 4C shows alert definition 440. Alert definition 440 contains many of the same fields as alert definition 424 shown in FIG. 4B. The fields in alert definition 440, however, have many different values for providing different operational functionalities, and are customizable (in one implementation). The alert provided by alert definition 440 is an intelligent classification service (ICS) alert. In one implementation, ICS is used for classifying incoming emails in a service management scenario. The content of the email is transferred to ICS, which tries to map the email content to a described problem symptom in a symptoms database. This process can often take a while, and it therefore runs asynchronously to an ongoing session with the call center agent. When the ICS has found a match in the symptoms database (which then can be associated with a solution), an event is raised ("ICSComplete") that triggers the alert in alert definition 440. This event is raised by ABAP server 226 (in one implementation) and propagated to Java Server 216. The alert is then sent to browser 204 and displayed in context area 302 (in one implementation), as shown in FIG. 3. In one implementation, the alert is a navigable alert. When a user selects (or clicks on) the alert visible in context area 302, the system may navigate to a solution search screen (as an example), where the user can search for a solution to the proposed symptom. The alert will be removed from context area 302 when the "InteractionEnded" event is raised. This event may be raised when the solution search has completed.

The identifier for alert definition 440 is "ICSComplete." Description field 402 indicates that the alert pertains to ICS completion. Java class field 404 specifies the particular class "com.sap.ic.service.alert.ICSCompleteAlert" for the alert to be used for ICS completion. This Java class provides many of the attributes and operations for the alert. Triggering events field 426 indicates that there is one pertinent triggering event, which is the "ICSComplete" event. In one implementation, the "ICSComplete" event is raised by ABAP server 226 and propagated to Java server 216. This event will trigger the issuance of the alert (which is then sent to browser 204).

Alert definition 440 also contains terminating events field 428. Terminating events field 428 indicates that there is one pertinent terminating event, which is the "InteractionEnded" event. When this event is raised, the alert specified by alert definition 440 can be terminated (and the alert can be removed from context area 302 in browser 204, in one implementation). In one implementation, when the terminating event is raised, Java server 216 sends a message to browser 204 indicating that the alert may be removed.

Message text field 432 indicates the message that will be displayed. In the example shown in FIG. 4C, the <messageText> tag includes field information for this text. Navigation field 434 provides the destination for the navigable alert. In the implementation shown in FIG. 4C, the alert provided ("ICSComplete") is a navigable alert. When the user selects (or clicks on) the alert when shown in context area 302 (in one implementation), the user is taken to the link provided in navigation field 434.

Message parameters field 436 provides the "ICSData" parameter. In one implementation, this message parameter is sent along with the alert to browser 204 (on client entity 202). In this implementation, browser 204 is able to process the parameter to determine how/when/etc. to display the alert. In one implementation, the message parameter indicates a name of script code (such as Javascript code) that is to be invoked by browser 204 while processing the alert. In this implementation, the "ICSData" parameter would indicate the name of a file or function within the Javascript code that is to be executed by browser 204.

FIG. 5 illustrates a partial screen display of an alert prominently displayed in reserved (context) area 302 (shown in FIG. 3). In this implementation, the partial screen display corresponds to reserved (context) area 302 that is persistently shown to a call center agent during all phases of a run-time session with a customer. As shown in FIG. 5, the partial screen display is part of an interaction center used for e-business sessions.

The partial screen display shown in FIG. 5 corresponds to reserved area 302 shown in FIG. 3. Reserved area 302 includes contains various forms of information. Various buttons are shown that relate to a call center agent's telephone connection to a customer at run time. The agent may select these buttons to perform various functionalities, such as accepting a call, rejecting a call, holding a call, hanging up a call, dialing a number, etc. More notably, reserved area 302 includes customer information 500 and alert information 502. Customer information 500 includes information about the given customer interacting with the call center agent during a session. As shown, the customer's name is "John Burton," and the customer's organization is "Sub 4 Minute Mile Inc." At a glance, the call center agent (at run time) is able to see this applicable information about the customer from customer information 500.

Alert information 502 contains pertinent alert information that can be displayed to the call center agent at run time. As shown in FIG. 5, the alert text indicates that "[t]his is a platinum customer!!" Immediately, the call center agent is informed of the status of the customer, so that appropriate action may be taken. For example, the agent may read special script information for platinum customers, or may provide special savings on certain purchases to platinum customers. In any case, the call center agent will be immediately aware of this information. Reserved area 302 is persistently visible to the call center agent, and alert messages are asynchronously shown (in real time) in alert information 502 for reference by the agent.

Figure 6:
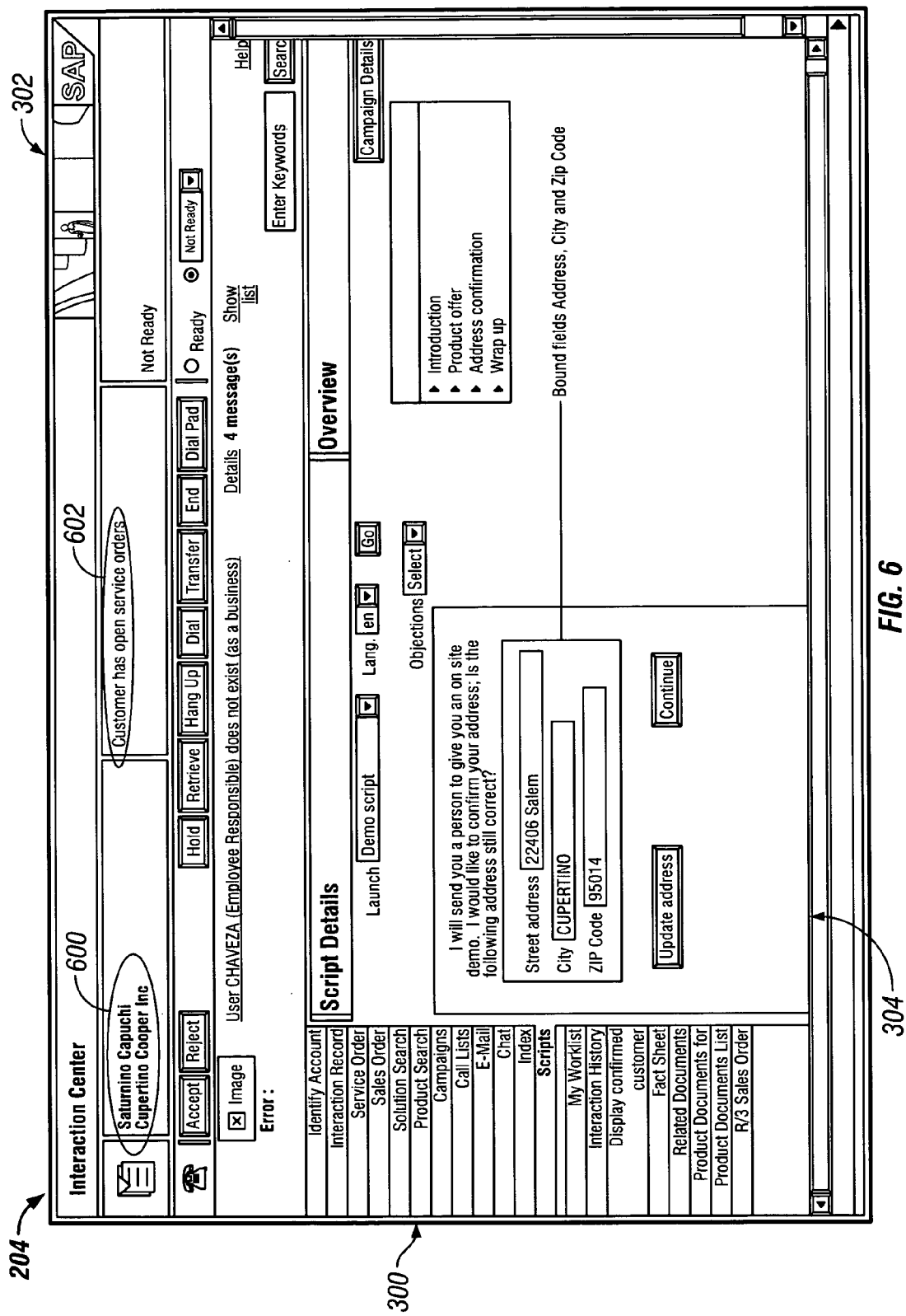
FIG. 6 illustrates a full screen display of an interaction center containing a navigable alert, according to one implementation.

FIG. 6 illustrates a full screen display of an interaction center containing a navigable alert, according to one implementation. In this implementation, browser 204 prominently displays a navigable alert 600 in reserved area 302 to a call center agent during a run-time session with a customer. After the agent sees navigable alert 600, the agent can select the alert in reserved area 302 to find out further details about the alert.

Browser 204 is used, in one implementation, by a call center agent in an interaction center environment, while conducting a session with a customer. In one implementation, the call center agent speaks with the customer using the telephone. Browser 204 includes reserved area 302, navigable bar 300, and work area 304. Navigation bar 300 includes many selectable items for display to the agent. The agent may select any of these items, and the appropriate (i.e., corresponding) contents will be displayed in work area 304. The agent may choose to send an email, engage in a chat session, read a script, etc., by selecting the appropriate function within navigation bar 300. As shown in FIG. 6, the agent has selected the "Scripts" item, indicating that script details will be shown in work area 304.

Work area 304 contains the script overview and detail information for a customized script that is read by the call center agent to the customer over the telephone (in one implementation). The script overview provides high-level information about the design and flow of the script to be read. The script detail portion of work area 304 provides the detailed script information. As shown in FIG. 6, the script to be read by the call center agent is an address confirmation script, to confirm the address of the customer.

Reserved area 302 contains customer information 600, and navigable alert 602. Customer information 600 is specific information about the customer that is part of the session. As shown, the customer's name is "Saturnino Capuchi," and the customer's organization is "Cupertino Cooper Inc." Navigable alert 602 is a selectable alert in text format. As shown, the text of navigable alert 602 indicates that the "[c]ustomer has open service orders." This text is persistently shown to the call center agent in reserved area 602. The text of this alert is also asynchronously displayed at run time, as soon as browser 204 receives the alert information from Java server 216. Once the agent sees the text of navigable alert 602, the agent may select (or click) on the text of the alert to see further detailed information about the alert. In one implementation, when the agent clicks on navigable alert 602, the details of the customer's open service orders are shown in another web browser screen. In another implementation, the details of the customer's open service orders are automatically shown in an additional web browser screen. Navigable alerts, such as alert 602, provide many benefits. For example, a call center agent can see instantly, and at a glance, a one-sentence summary of the alert notification by reading the text of navigable alert 602. In addition, the agent has the ability to quickly select the alert, and see additional details for the alert (e.g., the open service orders), without disrupting the session, or the context of the script shown in work area 304.

Figure 7:
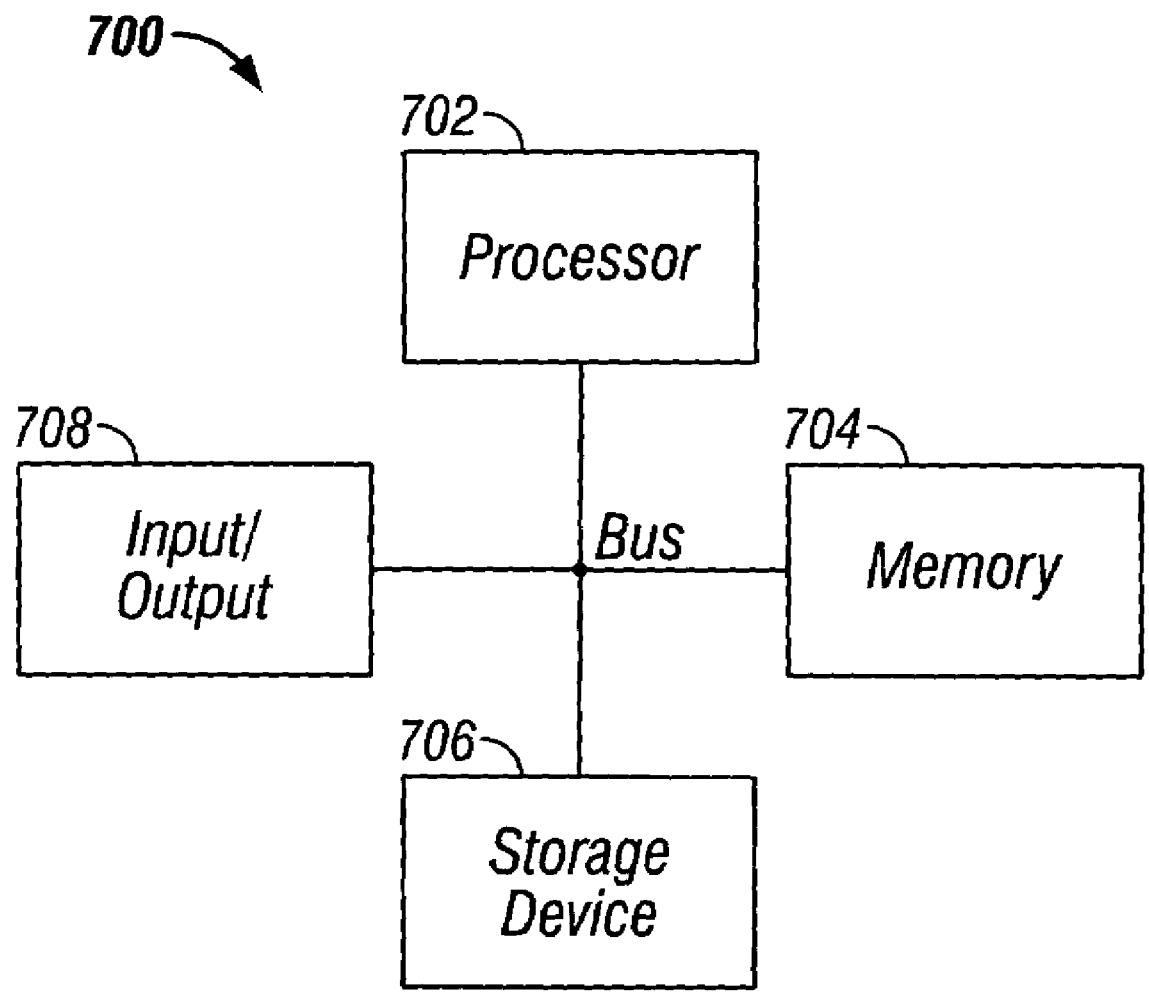
FIG. 7 illustrates a block diagram of a computing system having various computer-readable media.

FIG. 7 illustrates a block diagram of a computing system having various computer-readable media. Various implementations of the invention may be embodied in hardware, software, or a combination of hardware and software. For example, client entity 202, server entity 226, and/or server entity 216 (each shown in FIG. 2) may be implemented by a system similar to the one shown in FIG. 7. System 700 includes processor 702, memory 704, storage device 706, and input/output device 708. Each of components 702, 704, 706, and 708 are interconnected using a system bus. Processor 702 is capable of processing instructions for execution within system 700. In one implementation, processor 702 is a single-threaded processor. In another implementation, processor 702 is a multi-threaded processor.

Memory 704 stores information within system 700. In one implementation, memory 704 is a computer-readable medium. In one implementation, memory 704 is a read-only memory (ROM). In one implementation, memory 704 is a random-access memory (RAM). In one implementation, memory 704 is a volatile memory unit. In one implementation, memory 704 is a non-volatile memory unit.

Storage device 706 is capable of providing mass storage for system 700. In one implementation, storage device 706 is a computer-readable medium. In one implementation, storage device 706 is a floppy disk. In one implementation, storage device 706 is a hard disk. In one implementation, storage device 706 is an optical disk. In one implementation, storage device 706 is a tape.

Input/output device 708 provides input/output operations for system 700. In one implementation, input/output device 708 is a keyboard and/or pointing device. In one implementation, input/output device 708 is a display unit. In some implementations, system 700 does not include input/output device 708.

The various implementations of the invention described above provide many advantages. In various scenarios, a user (such as a call center agent) is capable of being notified of situations at opportune moments in time. For example, in a call center environment, a call center agent may engage in a transaction with a customer. After the customer has requested information about a particular product, the agent may receive a notification (that is prominently displayed on the screen) regarding other related product offerings, or a notification containing information based on prior transactions with the customer. The notification is displayed on a portion of the screen that is always visible to the call center agent, so that it will, in almost all instances, be seen by the agent. In addition, in various implementations, notification profiles can be configured and changed dynamically, so that no coding is required. XML implementations described above provide such flexibility and benefit. Navigable alerts also provide advantages. For example, a call center agent may select the navigable alerts to learn more detailed information about the alert, or to see subsequent pages in a web browser that provide additional information that can be conveyed to the customer.

In addition, any form of customer care agent could utilize various implementations of the invention described above. For example, an airport travel agent could utilize various implementations of the invention to be presented with alert notifications concerning transactions made with platinum flyers. Or, a rental care agent may obtain notification that a given customer at the check-out window has an unpaid balance. Any number of customer care agents could obtain benefit from such an alert system.

A number of implementations of the invention have been described. Nevertheless, it will be understood that various modifications may be made without departing from the spirit and scope of the invention. Accordingly, other implementations are within the scope of the following claims.

What is claimed is:

1. A computer-implemented method for displaying alert information, the method comprising:

in a graphical user interface (GUI) configured to facilitate communication between an organization's human service agent and a user, displaying session information in a first portion of the GUI, the session information configured to guide the human service agent in communicating with the user during an interactive service session; and displaying alert information in a second portion of the GUI, the alert information configured to provide the human service agent with information that supplements the session information and that has been provided by a module that automatically generates, at runtime and without user intervention, alert messages according to a dynamically customizable configuration setting, wherein the alert messages first exist in a system that is performing the method, in a format in which they are displayed, upon being generated by the module;

wherein the second portion of the GUI is located in proximity to the first portion of the GUI, at a fixed location that does not change for different interactive service sessions with different users, and is persistently displayed during the interactive service session.

2. The computer-implemented method of claim 1, wherein displaying session information in the first portion of the GUI includes displaying on-line chat information relating to an interactive chat session between the human service agent and the user.

3. The computer-implemented method of claim 1, wherein displaying alert information in the second portion of the GUI includes prominently displaying alert information customized information that is particular to the user.

4. The computer-implemented method of claim 1, wherein displaying alert information in the second portion of the GUI includes prominently displaying navigable alert information that is selectable by the human service agent to display alert-related information in a separate area of the GUI.

5. The computer-implemented method of claim 1, wherein the method further comprises displaying navigation information in a navigation area of the GUI, the navigation information relating to the interactive service session between the human service agent and the user, and the navigation information having selectable fields to control the session information displayed in the first portion of the GUI.

6. The computer-implemented method of claim 1, wherein the method comprises displaying information on a web-enabled display device.

7. The computer-implemented method of claim 1, wherein the human service agent is a customer care agent, the user is a customer, and displaying session information in the first portion of the GUI includes displaying session information relating to an interactive session between the customer care agent and the customer.

8. A computer-readable medium having computer-executable instructions stored thereon that, when executed, display a graphical user interface (GUI) for facilitating communication between an organization's human service agent and a user, the GUI comprising:

a first GUI portion to display session information configured to guide the human service agent in communicating with the user during an interactive service session; and a second GUI portion to display alert information, the alert information configured to provide the human service agent with information that supplements the session information and that has been provided by a module that automatically supplies, without user intervention, alert messages according to a dynamically customizable configuration setting, wherein the alert information contains navigable alert information that is selectable by the human service agent, wherein selection of the navigable alert information causes alert-related information to be displayed in a separate display area;

wherein the second GUI portion is located at a fixed location that does not change for different interactive sessions with different users, that is in proximity to the first GUI portion, and that is persistently displayed during the interactive service session.

9. The computer-readable medium of claim 8, wherein the alert information contains customized information that is particular to the user.

10. The computer-readable medium of claim 8, wherein the GUI further comprises a navigation area to display navigation information relating to the interactive service session between the human service agent and the user, the navigation information having selectable fields to control the session information displayed in the first GUI portion.

11. The computer-readable medium of claim 8, wherein the GUI further comprises a web browser.

12. The computer-readable medium of claim 8, wherein the human service agent is a customer care agent, the user is a customer, and the session information relates to an interactive service session between the customer care agent and the customer.

13. The computer-readable medium of claim 12, wherein the session information includes on-line chat information relating to an interactive chat session between the customer care agent and the customer.

14. A computer-readable medium having computer-executable instructions stored thereon for performing a method, the method comprising:

displaying, in a graphical user interface (GUI) configured to facilitate communication between an organization's human service agent and a user, session information in a first portion of the GUI, the session information configured to guide the human service agent in communicating with the user during an interactive service session; and displaying alert information in a second portion of the GUI, the alert information configured to provide the human service agent with information that supplements the session information and that has been provided by a module that automatically generates, at runtime and without user intervention, alert messages according to a dynamically customizable configuration setting, wherein the alert messages first exist in a system that is executing the computer-executable instructions, in a format in which they are displayed, upon being generated by the module;

wherein the second portion of the GUI is located in proximity to the first portion of the GUI, at a fixed location that does not change for different interactive service sessions with different users and persistently displayed during the interactive service session.

15. The computer-implemented method of claim 7, wherein displaying alert information in the second portion of the GUI comprises displaying information about an additional product or service that is different from but related to a product or service corresponding to the interactive session, wherein a cross-selling opportunity exists with respect to the additional product or service.

16. The computer-readable medium of claim 12, wherein the alert information corresponds to an additional product or service that is different from but related to a product or service corresponding to the interactive service session, wherein a cross-selling opportunity exists with respect to the additional product or service.

17. The computer-implemented method of claim 1, wherein the module automatically generates an alert message by accessing a stored alert message having one or more placeholder values, and replacing the one or more placeholder values with corresponding contextual parameters associated with the session information.

18. The computer-implemented method of claim 1, further comprising displaying pop-up information corresponding to the alert information upon receiving input that a cursor associated with a pointing device is positioned over the alert information displayed in the second portion of the GUI.

19. The computer-readable medium of claim 8, wherein the second GUI portion is configured to display alert information asynchronously with respect to the session information displayed in the first GUI portion.

20. The computer-readable medium of claim 8, wherein the method further comprises removing the navigable alert information from the second GUI portion when the navigable alert information is selected and alert-related information is displayed in the separate display area.

* * * * *